United States Patent
Bond et al.

(10) Patent No.: US 9,056,431 B2
(45) Date of Patent: Jun. 16, 2015

(54) APPARATUS COMPRISING AN END FITTING CONNECTED TO A BODY

(75) Inventors: David Bond, Gloucestershire (GB); Paul Trowbridge, Oxford (GB); Andrew Smith, Gloucester (GB); Richard Masson, Buc (FR); Patrick Dunleavy, Palaiseau (FR)

(73) Assignees: MESSIER-DOWTY LIMITED, Gloucester (GB); MESSIER-BUGATTI-DOWTY, Velizy-Villacoublay (FR)

( * ) Notice: Subject to any disclaimer, the term of this patent is extended or adjusted under 35 U.S.C. 154(b) by 490 days.

(21) Appl. No.: 13/392,439

(22) PCT Filed: Aug. 24, 2010

(86) PCT No.: PCT/GB2010/051399
§ 371 (c)(1),
(2), (4) Date: Mar. 13, 2012

(87) PCT Pub. No.: WO2011/023994
PCT Pub. Date: Mar. 3, 2011

(65) Prior Publication Data
US 2012/0163905 A1 Jun. 28, 2012

(30) Foreign Application Priority Data
Aug. 26, 2009 (GB) .................................. 0914876.8

(51) Int. Cl.
*F16B 11/00* (2006.01)
*B29C 70/86* (2006.01)
(Continued)

(52) U.S. Cl.
CPC ............... *B29C 70/86* (2013.01); *Y10T 403/47* (2015.01); *Y10T 29/49826* (2015.01);
(Continued)

(58) Field of Classification Search
CPC ....... F16C 7/026; F16C 3/026; B29C 53/585; B29C 70/86

USPC ................ 403/265, 179, 185, 204, 269, 360; 464/181
See application file for complete search history.

(56) References Cited

U.S. PATENT DOCUMENTS 2,751,237 A * 6/1956 Conley ........................ 285/133.4
3,881,973 A * 5/1975 Pinckney ........................ 156/86
(Continued)

FOREIGN PATENT DOCUMENTS

DE 3320605 A1 * 12/1984 ................ B32B 1/08
DE 195 24 903 4/1997
(Continued)

OTHER PUBLICATIONS

Examination Report in GB Application No. 0914876.8 dated Jun. 14, 2012.
(Continued)

*Primary Examiner* — Daniel P Stodola
*Assistant Examiner* — Matthew R McMahon
(74) *Attorney, Agent, or Firm* — Marshall, Gerstein & Borun LLP

(57) ABSTRACT

An apparatus includes a fitting connected to a body. The fitting has an engagement portion including a channel formed into a peripheral surface of it and an axis. The body includes an axial layer provided around at least some of the peripheral surface of the engagement portion of the end fitting and a hoop layer provided around the axial layer at a location corresponding to at least some of the channel so as to urge at least some of the axial layer into a portion of the channel. The channel is arranged such that at least some of it defines a pathway that is non-orthogonal with respect to the axis of the fitting, such that at least some of the surface area of the channel defines a load bearing surface for the transfer of torque between the fitting and body when a rotational force is applied to one of them.

18 Claims, 2 Drawing Sheets

(51) Int. Cl.
*B29C 70/30* (2006.01)
*F16C 7/02* (2006.01)
B29C 53/58 (2006.01)
B29C 70/48 (2006.01)
B29L 31/00 (2006.01)

(52) U.S. Cl.
CPC ........... Y10T 403/475 (2015.01); Y10T 403/37 (2015.01); *B29C 53/585* (2013.01); *B29C 70/30* (2013.01); *B29C 70/48* (2013.01); *B29L 2031/75* (2013.01); *F16C 7/026* (2013.01); Y02T 50/433 (2013.01)

(56) References Cited

U.S. PATENT DOCUMENTS

| | | | |
|---|---|---|---|
| 4,732,634 A * | 3/1988 | Hill et al. | 156/161 |
| 4,886,944 A * | 12/1989 | Christopher et al. | 200/48 R |
| 4,992,313 A * | 2/1991 | Shobert et al. | 428/36.1 |
| 5,043,217 A | 8/1991 | Peters et al. | |
| 5,152,945 A * | 10/1992 | Thicthener et al. | 264/136 |
| 5,160,392 A | 11/1992 | Thongs, Jr. | |
| 5,227,208 A * | 7/1993 | Thongs, Jr. | 428/34.7 |
| 6,116,113 A * | 9/2000 | Pazdirek et al. | 74/579 R |
| 7,682,256 B2 * | 3/2010 | Brace et al. | 464/181 |
| 7,963,853 B2 * | 6/2011 | Brace et al. | 464/181 |
| 8,056,935 B2 * | 11/2011 | Gustafson et al. | 285/290.1 |
| 2001/0025664 A1 | 10/2001 | Quigley et al. | |
| 2002/0185188 A1 * | 12/2002 | Quigley et al. | 138/137 |
| 2003/0107186 A1 | 6/2003 | Salama | |
| 2004/0048022 A1 * | 3/2004 | Pratt | 428/36.91 |
| 2004/0088849 A1 | 5/2004 | Reynolds, Jr. et al. | |
| 2005/0067037 A1 | 3/2005 | Salama | |
| 2006/0258469 A1 | 11/2006 | Dewhirst et al. | |
| 2008/0283667 A1 | 11/2008 | Darrow | |
| 2010/0055383 A1 * | 3/2010 | Schalla et al. | 428/99 |
| 2011/0192528 A1 * | 8/2011 | Kozaki et al. | 156/173 |

FOREIGN PATENT DOCUMENTS

| | | |
|---|---|---|
| EP | 0 538 832 | 4/1993 |
| EP | 0 907 049 | 4/1999 |
| EP | 1 154 166 | 11/2001 |
| EP | 1 900 946 | 3/2008 |
| EP | 2 189 274 | 5/2010 |
| GB | 1 356 393 | 6/1974 |
| JP | 2-114215 | 9/1990 |
| JP | 2009-040003 | 2/2009 |
| WO | WO-2005/036042 | 4/2005 |
| WO | WO-2007/145533 | 12/2007 |
| WO | WO-2009/035344 A2 | 3/2009 |

OTHER PUBLICATIONS

Examination Report in Chinese Application No. 201080038321.0 dated Nov. 28, 2013.
Search Report in GB Application No. GB 0914876.8 dated Dec. 21, 2009.
Notice of Reasons for Rejection in JP Application No. 2012-526127 dated Mar. 4, 2014.
International Search Report in PCT/GB2010/051399 dated Dec. 2, 2010.

* cited by examiner

APPARATUS COMPRISING AN END FITTING CONNECTED TO A BODY

BACKGROUND

There are many known applications where it is advantageous to reduce the weight of one or more components of an apparatus. Examples include land and sea vehicles, aircraft and personal equipment. It is known to replace some components, such as metal components, with composite equivalents because a composite equivalent is generally much lighter than the metal component it replaces. Thus, the application of composites in components is becoming increasingly common in the search for reduced weight and increased efficiency. It is not however always appropriate to replace an entire component with a composite equivalent because the composite material may not have the necessary characteristics to form particular elements. An example is a threaded fitting. Consequently, it is known to manufacture or form a part which includes a non-composite component connected to a composite component.

As noted above, an example of an application in which it would be advantageous to use particular composite components is within an aircraft, for example as part of a landing gear assembly. However, certain components of typical landing gear assemblies, such as retraction actuators and side stays, are subject to significant axial and compressive forces. Other components may be subject to various forces and/or torque. Consequently, any partial composite component should be designed to withstand such forces and/or torque, particularly at the interfaces between composite and non-composite elements of the component.

SUMMARY

According to a first aspect of the present invention, there is provided apparatus comprising a fitting connected to a body, the fitting having an engagement portion including a channel formed into a peripheral surface of it and an axis, the body including an axial layer provided around at least some of the peripheral surface of the engagement portion of the end fitting and a hoop layer provided around the axial layer at a location corresponding to at least some of the channel so as to urge at least some of the axial layer into a portion of the channel, wherein the channel is arranged such that at least some of it defines a pathway that is non-orthogonal with respect to the axis of the fitting, such that at least some of the surface area of the channel defines a load bearing surface for the transfer of torque between the fitting and body when a rotational force is applied to one of them.

Thus, the portion of the channel that defines a pathway being non-orthogonal with respect to the axis, for example the longitudinal axis or another axis of rotation, acts in an analogous manner to "splines" or the like. Consequently, the surface area of the non-orthogonal portion enables the passage of torque between the body and fitting. The hoop layer acts to inhibit the axial layer from spaying out of the channel under load conditions, including during the transfer of torque between the body and fitting and during axial loading.

The pathway of at least some of the channel may extend in a non-linear configuration.

Thus, at least some of the channel may have, for example, a sinusoidal, generally square wave or saw tooth wave configuration. Such a configuration will often result in a channel having numerous portions that are non-orthogonal with respect to the axis of the fitting.

The channel may comprise a plurality of portions each arranged to define a pathway that is non-orthogonal with respect to the axis of the fitting.

A plurality of portions each arranged to define a pathway that is non-orthogonal with respect to the axis of the fitting may improve the torque transfer characteristics of the apparatus relative to apparatus having only a single portion that is non-orthogonal with respect to the axis of the fitting.

The channel may encircle the peripheral surface of the engagement portion of the fitting.

At least some of the channel may have a planar side wall arranged to react axial forces applied to the apparatus. The apparatus may further comprise a collar arranged to be mechanically coupled to the fitting so as to encase the part of the body adjacent the channel.

At least some of the channel may have a curved cross-section.

Thus, in some embodiments, the channel does not define any sharp edges that could lead to stress concentrations in the joint between the body and fitting.

The apparatus may comprise a plurality of discrete channels. The channels may be substantially identical to one another.

The fitting may comprise a non-composite part. The axial layer may comprise a composite material. The hoop layer may comprise a composite material.

Thus, the body of the apparatus can be formed of a composite material that is likely, in many cases, to be lighter and have other advantageous properties relative to a non-composite material, such as metal. The fitting, however, may be formed of a non-composite part, such as metal, that has advantageous properties over composite material for the component in question.

According to a second aspect of the present invention, there is provided a method of forming apparatus comprising a fitting connected to a body, the method including the steps of: providing a fitting having an engagement portion including a channel formed into a peripheral surface of it and an axis, wherein the channel is arranged such that at least some of it defines a pathway that is non-orthogonal with respect to the axis of the fitting; and forming a body by: providing an axial layer around at least some of the peripheral surface of the engagement portion of the fitting; and providing a hoop layer around the axial layer at a location corresponding to at least some of the channel, so as to urge at least some of the axial layer into a portion of the channel, such that at least some of the surface area of the channel forms a load bearing surface for the transfer of torque between the fitting and body when a rotational force is applied to one of them.

The method may comprise the further steps of providing alternating axial and hoop layers, respectively, until the body has a substantially cylindrical configuration.

The method may comprise the step of providing a further axial layer around at least some of the peripheral surface.

The step or steps of providing an axial layer may comprise braiding the axial layer. The step or steps of providing a hoop layer may comprise filament winding the hoop layer.

BRIEF DESCRIPTION OF THE DRAWINGS

Embodiments of the present invention will now be described, by way of non-limiting example only, with reference to the accompanying drawings, in which.

DETAILED DESCRIPTION

Figure 1:
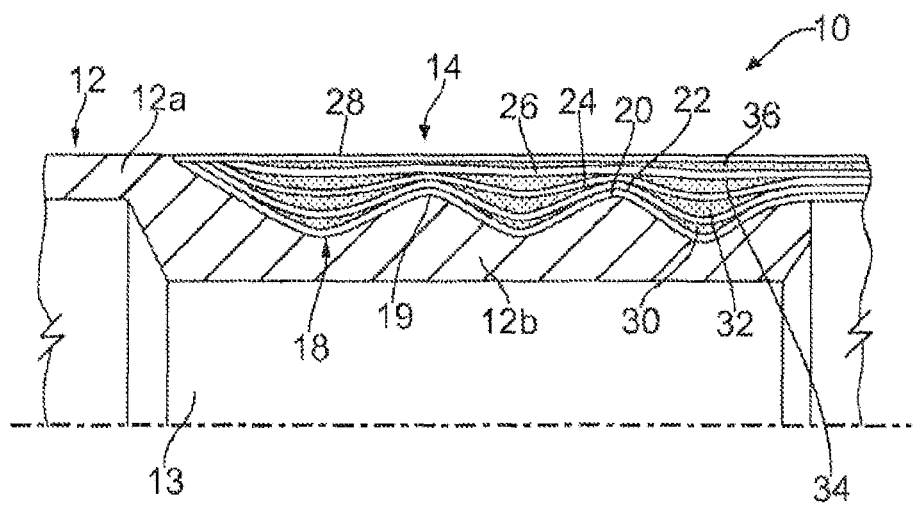
FIG. 1 shows a partial longitudinal section of apparatus according to an embodiment of the present invention comprising an end fitting connected to a body.

By way of an overview, FIG. 1 shows a partial, longitudinal section view of apparatus 10 according to an embodiment of the present invention. The apparatus 10 comprises a composite body 14 connected to a non-composite end fitting 12. The end fitting 12 is generally cylindrical in shape, comprising a shoulder portion 12a that narrows in diameter to form an engagement portion 12b. The engagement portion 12b includes, in this embodiment, a plurality of channels 18. Each channel 18 is separated by a peak or land region 19. The end fitting 12 is hollow, defining a blind hole 13 which may be arranged to receive a screw or other connection or fixing means. The body 14 is mechanically interlocked with the end fitting 12.

Figure 2A:
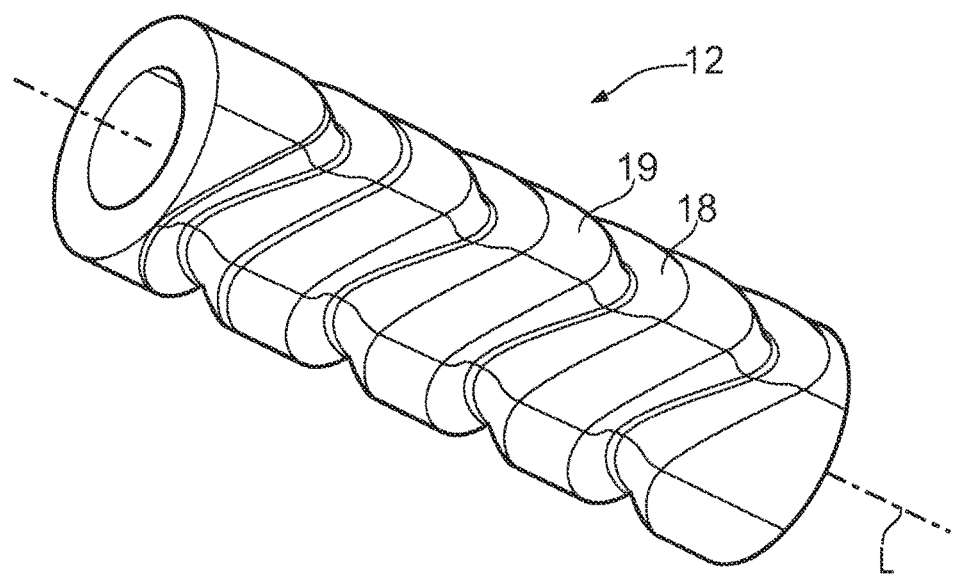
FIGS. 2a and 2b show perspective views of an end fitting of apparatus according to an embodiment of the present invention.
Figure 2B:
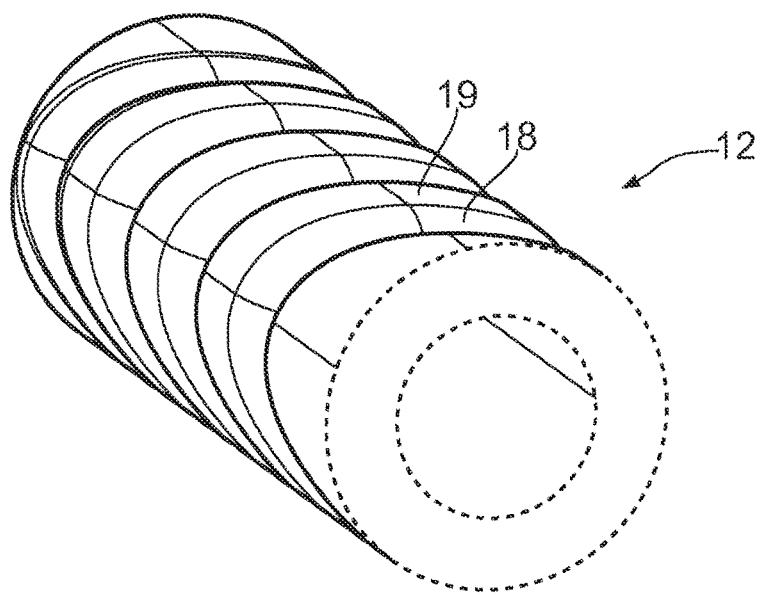

Referring to FIGS. 2a and 2b, an example of an end fitting 12 of the apparatus according to an embodiment of the present invention is shown. The end fitting 12 is generally cylindrical in shape and has a longitudinal axis L. In some embodiments the longitudinal axis L may be replaced by an axis of rotation. A plurality of channels 18 extend around the periphery of the side wall of the end fitting 12. The channels 18 are arranged such that each defines at least a portion that is non-orthogonal with respect to the longitudinal axis L. In the illustrated example, an engagement portion 12b of the end fitting 12 comprises a plurality of discrete channels that each follows a non-linear path, i.e. non-circular path, around the circumference of the end fitting 12. More specifically, the channels have a generally sinusoidal path around the circumferential side wall of the end fitting 12. In this example each channel 18 is identical with every other channel, although this need not be the case. Adjacent channels are separated by a peak or land region 19 that may take any suitable configuration. Each channel 18 has a curved cross-section, which may reduce stress concentrations in the joint, as described below with reference to FIG. 1. Due to the non-orthogonal portions of the channels around the periphery of the end fitting 12, the channels are arranged such that at least some of the surface area of each channel 18 forms a load bearing surface for the transfer of torque between the end fitting 12 and a composite body 14 connected to it, when a rotational force is applied to one of them. This is because the surface area of the channels that is arranged to be non-orthogonal with respect to the longitudinal axis acts in an analogous fashion to "splines" when a rotation force is applied to either the end fitting or the body about the longitudinal axis, thereby facilitating the passage of torque between the composite and non-composite components.

It should be noted that the end fitting is not limited to the illustrated configuration and may in other embodiments have any suitable shape including one or more channels arranged in any suitable configuration such that at least a portion of a channel extends in a direction that is non-orthogonal with respect to the longitudinal axis and/or the axis of rotation of the end fitting. A non-exhaustive list of examples of alternative channel arrangements may be a helical channel, one or more non-linear channels, such as generally saw-tooth or square wave shaped channels extending around the periphery of the end fitting. If a helical channel is provided, it may be configured such that sheer stress varies along its pathway to assist in the transfer of torque. It is advantageous that the pathway of a channel does not define sharp edges, as in some embodiments this may minimise stress concentrations. It is advantageous if the configuration of the longitudinal section of the engagement portion 12b resembles a sinusoid such that the succession of channels define a smooth "wave" pattern which in some embodiments may reduce stress concentrations in the joints relative to an engagement portion having sharp edges. It should be noted that the number of channels, the angle of the side profiles and the radii of the base of the channels and/or the pathway configuration of the channels may be determined by the axial load to be carried and/or the level of torque to be transferred. Furthermore, a channel need not extend entirely around the periphery of the end fitting. It will be appreciated that the end fitting need not be hollow and may be formed of any suitable material, non-limiting examples being metal, plastic or the like.

Referring back to FIG. 1, the body 14 is formed a composite material, for example a reinforcing material such as fibre provided around the end fitting 12, the fibres being bonded with a material such a resin. Composite materials will be well known to a skilled person and consequently will not be described in any great detail. The body comprises a first axial layer 20 provided around the engagement portion 12b of the end fitting 12. The first axial layer 20 extends axially away from the end fitting 12 to define a first elongate body layer. The axial layer in the illustrated example is formed of a triaxially braided composite, although any suitable braided composite may be used. As will be known to a skilled person, a triaxially braided composite may be formed of carbon fibre "toes" arranged at three different angles. A first group of toes run in a generally axial direction of the body. A second and third group each run at a respective positive and negative angle to the axial toes, for example +/−30°.

A first hoop layer 30 is provided around the first axial layer 20 at locations corresponding to the channels 18. The hoop layer in this example comprises carbon fibre toes wrapped around the axial layer at locations corresponding to the channels. The first hoop layer 30 functions to urge portions of the first axial layer 20 into the channels 18. As can be seen from FIG. 1, the cross-section of the bands of the hoop layer are non-uniform in that they are deeper towards the centre of a channel than near its edges. By urging or pulling the first axial layer 20 down into the channels 18, as will occur during formation of the hoop layer, the apparatus 10 is arranged to react axial loads due to the sloping sides of the channels defining load bearing surfaces upon such loads being applied and the axially braided fibre is urged or displaced outwards in a radial direction. The first hoop layer 30 holds the portions of the first axial layer 20 within the channels 18 to resist splaying thereof upon the application of such loads, as well as filling in some of each channel 18 so as to reduce depth of the free part of the channel above it, which can result in a flat outer surface profile of the body 14 once a number of alternating layers have been build up. A plurality of alternating axial layers 20, 22, 24, 26, 28 and hoop layers 30, 32, 34, 36 are provided around the circumference of the engagement portion 12b of the end fitting 12 to define an elongate composite body 14.

Figure 3:
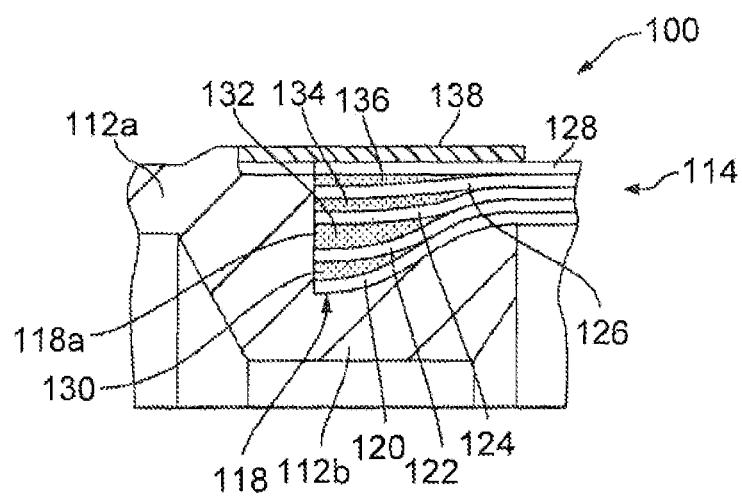
FIG. 3 shows a partial longitudinal section of apparatus according to a further embodiment of the present invention comprising an end fitting connected to a body.

FIG. 3 shows apparatus 100 according to a further embodiment of the present invention comprising an end fitting connected to a body. In this embodiment, the end fitting 112 includes a single channel 118 having a planar side wall 118a arranged to react compressive axial forces applied to the apparatus 100. A curved side wall of the channel 118 is arranged to bear tensile axial forces applied to the apparatus 100. As with the embodiment described with reference to FIG. 1, a series of alternating layers of axial layers and hoop layers 120, 122, 124, 126, 130, 132, 134, 136 are built up around the engagement portion 112b of the end fitting 112. A collar 138 is fitted over the engagement portion 112b so as to assist in retaining the anchoring portion of body 114 within the channel 118. The collar is secured with a screw thread. However, any suitable means may be used to secure the collar 138 to the end fitting 112.

Whilst this embodiment is only shown with a single channel 18, either the feature of the collar 38 or the planar side wall could be incorporated into an end fitting 12 having a plurality of channels 18. In some embodiments, the planar side wall may be omitted in favour of a curved side wall, such as that shown in FIG. 1.

The combination of the alternating axial and hoop layers and the channel portion or portions extending in a direction that is non-perpendicular with respect to the axis of rotation of the end fitting 12 results, in some embodiments of the present invention, in a joint between a composite body and non-composite fitting capable of delivering a high degree of torque, as well as axial forces, without the axial layers splaying out of the channels which form the load bearing surfaces.

A method of forming apparatus comprising an end fitting connected to a body according to an embodiment of the present invention will now be described. An end fitting 12 is provided including one or more channels 18, at least a portion of which extend in a pathway that is non-orthogonal with respect to the longitudinal axis of the end fitting 12 and/or the intended axis of rotation thereof. The body 14 is built up around the end fitting. The method of this example includes the following steps. A first axial layer 20 is wound around the engagement portion 12b of the end fitting 12 and beyond in a direction away from the shoulder 12a so as to form a first layer of the elongate body part 14. The axial layer may be formed by any suitable process, for example, by a braiding machine arranged to wind between 500 and 600 carbon fibre toes to form a tri-axially braided composite layer. A hoop layer 30 is then wound around the first axial layer 20 at a location corresponding to the channels 18 using a filament winding process to wind carbon fibre toes into a desired configuration. As can be seen from FIG. 1, the first hoop layer 30 urges the first axial layer 20 down into the channels 18. As will be appreciated, the filament winding process includes some lateral movement to create a hoop layer that is thicker in the middle of each hoop than at either side. Following the first axial layer 20 and first hoop layer 30, a second axial layer 22 is wound over the first two layers 20, 30, in the same manner as the first axial layer 20, so as to build up the body 14. Following this, a second hoop layer 32 is wound around the second axial layer 22 at a location corresponding to the channels 18. This process is repeated as desired so as to build up axial layers 20 to 26 and hoop layers 30 to 36. Once the final hoop layer 36 is wound, a final axial layer 28 may be wound to form a straight sided cylindrical body 14.

Once the fibre toes have been wound into the respective layers, they may be infused with resin, for example by a Vacuum-Assisted Resin Transfer Moulding (VARTM) process. However, any suitable method may be used to introduce resin to the fibre to form a composite component.

In some embodiments, an adhesive layer may be provided between the end fitting and one or more composite layers.

Apparatus according to one or more of the embodiments of the present invention may be used as a structural transmission of high loads, such as in vehicle prop shaft, components in aeroplane landing gears or the like.

The invention claimed is:

1. Apparatus comprising:
a fitting connected to a body, the fitting having an engagement portion including a channel formed into a peripheral surface of the engagement portion and an axis, the body including an axial layer provided around at least some of the peripheral surface of the engagement portion of the end fitting and a hoop layer provided around the axial layer at a location corresponding to at least some of the channel so as to urge at least some of the axial layer into a portion of the channel,
wherein the channel is arranged such that at least some of the channel defines a pathway that is non-orthogonal with respect to the axis of the fitting, such that at least some of the surface area of the channel defines a load bearing surface for the transfer of torque between the fitting and body when a rotational force is applied to one of them, wherein the pathway of a portion of the channel extends around the peripheral surface of the fitting in an undulating manner.

2. Apparatus according to claim 1, wherein the channel comprises a plurality of portions each arranged to define a pathway that is non-orthogonal with respect to the axis of the fitting.

3. Apparatus according to claim 1, wherein the channel encircles the peripheral surface of the engagement portion of the fitting.

4. Apparatus according to claim 1, wherein at least some of the channel has a planar side wall arranged to react axial forces applied to the apparatus.

5. Apparatus according to claim 4, further comprising a collar arranged to be mechanically coupled to the fitting so as to encase the part of the body adjacent the channel.

6. Apparatus according to claim 1, wherein at least some of the channel has a curved cross-section.

7. Apparatus according to claim 1, further comprising a plurality of discrete channels.

8. Apparatus according to claim 7, wherein the channels are substantially identical to one another.

9. Apparatus according to claim 1, further comprising a plurality of axial layers and a plurality of hoop layers.

10. Apparatus according to claim 1, wherein one or more of the hoop layers are disposed within the channel.

11. Apparatus according to claim 1, wherein the fitting comprises a non-composite material.

12. Apparatus according to claim 1, wherein the axial layer comprises a composite material.

13. Apparatus according to claim 12, wherein the axial layer comprises a triaxially braided composite material.

14. Apparatus according to claim 1, wherein the hoop layer comprises a composite material.

15. Apparatus according to claim 1, wherein the non-linear portion of the channel extends in a wave-like manner.

16. Apparatus according to claim 1, wherein the non-linear configuration includes a bend.

17. Apparatus according to claim 16, wherein the non-linear portion of the channel does not contain a branch.

18. Apparatus comprising:
a fitting connected to a body, the fitting having an engagement portion including a channel formed into a peripheral surface of the engagement portion and an axis, the body including an axial layer provided around at least some of the peripheral surface of the engagement portion of the end fitting and a hoop layer provided around the axial layer at a location corresponding to at least some of the channel so as to urge at least some of the axial layer into a portion of the channel,
wherein the channel is arranged such that at least some of the channel defines a pathway that is non-orthogonal with respect to the axis of the fitting, such that at least some of the surface area of the channel defines a load bearing surface for the transfer of torque between the fitting and body when a rotational force is applied to one of them, wherein the pathway of at least some of the channel extends around the peripheral surface of the fitting in a perimetrically undulating manner.

* * * * *